(12) United States Patent
Tae

(10) Patent No.: US 12,233,965 B2
(45) Date of Patent: Feb. 25, 2025

(54) STEERING APPARATUS AND STEERING CONTROL METHOD

(71) Applicant: HL MANDO CORPORATION, Pyeongtaek-si (KR)

(72) Inventor: Hyunchul Tae, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 722 days.

(21) Appl. No.: 17/311,072

(22) PCT Filed: Nov. 29, 2019

(86) PCT No.: PCT/KR2019/016695
§ 371 (c)(1),
(2) Date: Jun. 4, 2021

(87) PCT Pub. No.: WO2020/116864
PCT Pub. Date: Jun. 11, 2020

(65) Prior Publication Data
US 2022/0041207 A1 Feb. 10, 2022

(30) Foreign Application Priority Data

Dec. 6, 2018 (KR) .................. 10-2018-0155967

(51) Int. Cl.
*B62D 5/04* (2006.01)
*B62D 3/12* (2006.01)
*B62D 15/02* (2006.01)

(52) U.S. Cl.
CPC ............ *B62D 5/0463* (2013.01); *B62D 3/123* (2013.01); *B62D 5/0484* (2013.01); *B62D 15/0215* (2013.01)

(58) Field of Classification Search
CPC ........ B62D 5/001; B62D 5/003; B62D 5/005; B62D 5/0463; B62D 5/0481;
(Continued)

(56) References Cited

U.S. PATENT DOCUMENTS

2005/0045413 A1 3/2005 Shitamitsu et al.
2006/0042859 A1* 3/2006 Itoh .................. B62D 5/003
180/402
(Continued)

FOREIGN PATENT DOCUMENTS

CN 1590183 A 3/2005
CN 104875786 A 9/2015
(Continued)

OTHER PUBLICATIONS

Wikipedia article "Force between magnets"; https://en.wikipedia.org/w/index.php?title=Force_between_magnets&oldid=871010237 ( Published Nov. 28, 2018). (Year: 2018).*
Wikipedia article "Eddy current brake"; https://en.wikipedia.org/w/index.php?title=Eddy_current_brake&oldid=867865209 (Published Nov. 8, 2018) (Year: 2018).*

*Primary Examiner* — Lail A Kleinman
*Assistant Examiner* — Mario C Gonzalez
(74) *Attorney, Agent, or Firm* — Hauptman Ham, LLP

(57) ABSTRACT

The present disclosure relates to a steering apparatus and a steering control method. A steering apparatus of the present disclosure comprises: a sensor which measures the steering angle on the basis of the torque of a steering wheel; a steering control module including one electronic control unit that controls a reaction force motor by using information on the steering angle measured by the sensor; and an auxiliary reaction force module which provides a reaction force to a steering shaft or a motor shaft by not applying a current from the electronic control unit during an abnormal operation of the electronic control unit.

5 Claims, 15 Drawing Sheets

(58) Field of Classification Search
CPC .... B62D 5/0484; B62D 5/0487; B62D 5/049;
B62D 5/0493; B62D 3/123; B62D
15/0215; B62D 6/008; G01L 5/221; B60L
7/28; H02K 49/04; H02K 49/043; H02K
49/046
See application file for complete search history.

(56) References Cited

U.S. PATENT DOCUMENTS

| | | |
|---|---|---|
| 2015/0239492 A1 | 8/2015 | Yukitake |
| 2016/0159388 A1* | 6/2016 | Sekiya ................. B62D 5/0409 |
| | | 180/446 |
| 2018/0037254 A1 | 2/2018 | Izutani et al. |
| 2020/0062298 A1* | 2/2020 | Farhat ................. B62D 5/0481 |
| 2021/0399659 A1* | 12/2021 | Uemura ................. G05B 9/03 |

FOREIGN PATENT DOCUMENTS

| | | | | |
|---|---|---|---|---|
| CN | 107685765 A | | 2/2018 | |
| CN | 108116588 A | | 6/2018 | |
| JP | H0614523 A | * | 1/1994 | |
| JP | 2007185985 A | | 7/2007 | |
| JP | 2008137413 A | | 6/2008 | |
| JP | 2009056888 A | | 3/2009 | |
| JP | 2017226319 A | | 12/2017 | |
| KR | 20030004482 A | | 1/2003 | |
| KR | 20120069933 A | * | 6/2012 | ............... B62D 3/12 |
| KR | 20180039446 A | | 4/2018 | |
| WO | WO2000044083 A1 | * | 7/2000 | ............. H02K 26/00 |

\* cited by examiner

STEERING APPARATUS AND STEERING CONTROL METHOD

CROSS-REFERENCE OF RELATED APPLICATIONS

This application is the U.S. National Phase under 35 U.S.C. § 371 of International Patent Application No. PCT/KR2019/016695, filed on Nov. 29, 2019, which claims the benefit of Korean Patent Application No. 10-2018-0155967, filed on Dec. 6, 2018, the entire disclosures of each are incorporated by reference herein.

TECHNICAL FIELD

The disclosure relates to a steering device and a steering control method, and more specifically, to a steering device and a steering control method for providing a steering reaction force when a failure occurs in an electronic control unit for steering control.

BACKGROUND ART

A vehicle is equipped with a vehicle electronic control unit (ECU) that receives electrical signals detected by various input sensors and outputs control signals for driving various actuators. The electric power steering system adds or subtracts the steering force of the steering wheel according to the speed of the vehicle using the ECU. Specifically, the electric power steering system assists the driver in maneuvering the steering wheel by adjusting the steering force by driving a motor. For example, the electric power steering system decreases the steering force when the vehicle parks or travels at low speed while increasing the steering force when the vehicle travels at high speed, thereby leading to stable high-speed driving.

Since control is typically performed by the ECU in the electric power steering system, the ECU is duplicated to ensure stable high-speed driving in the event of an ECU failure. Accordingly, even when one ECU fails, the other ECU may detect the steering angle and adjust the steering force. However, having two ECUs increases costs and requires connection and communication between the two ECUs and other components, causing the configuration more complicated.

DISCLOSURE

Technical Problem

In light of the background, according to the disclosure, there are provided a steering device that has only one electronic control unit (ECU) and includes an auxiliary reaction force module that may provide a steering reaction force to the steering shaft or motor shaft when the electronic control unit fails and a method for controlling the same.

Technical Solution

According to an embodiment of the disclosure, there is provided a steering device includes a sensor measuring a steering angle by a steering force of a steering wheel, a steering control module including one electronic control unit to control a reaction force motor using steering angle information measured by the sensor, and an auxiliary reaction force module providing a reaction force to a steering shaft or a motor shaft as no current is applied by the electronic control unit when the electronic control unit abnormally operates.

According to another embodiment of the disclosure, there is provided a steering control method includes receiving steering angle information by a steering force of a steering wheel measured by a sensor, by an electronic control unit of a steering control module, controlling a reaction force motor using the steering angle information measured by the sensor, by the electronic control unit, and supplying no current to the auxiliary reaction force module, by the electronic control unit, to allow the electronic control unit to provide a reaction force to a steering angle or a motor shaft when the electronic control unit abnormally operates.

Advantageous Effects

As described above, since the steering device of the disclosure has only one electronic control unit, it is possible to save costs as compared with when two electronic control units are provided. Further, the steering device of the disclosure may provide a steering reaction force by the auxiliary reaction force module even when the electronic control unit fails, enhancing driving stability.

Further, according to the disclosure, since there is an upper limit to the steering reaction force that may be provided by the auxiliary reaction force module, steering reaction force may be provided in a relatively safe range by the auxiliary reaction force module even in the event of a failure.

MODE FOR INVENTION

Hereinafter, embodiments of the disclosure are described in detail with reference to the accompanying drawings. Such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements. When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element.

In an electronic steering system, steering control is performed by an electronic control unit (ECU). If such an electronic control unit fails, driving stability may be impaired, and thus the electronic control unit is conventionally duplicated. Accordingly, if one ECU fails, the other ECU may detect the steering angle and adjust the steering force, so that 100% or less of the power may be output depending on the configuration. Basically, if one of the electronic control units fails, a diagnostic trouble code (DTC) is displayed, and a warning light is turned on. Further, a clear notification for the current status of the vehicle may be transferred to the driver to allow him to minimize driving, or the steering force may be increased to allow the driver to visit a repair shop.

Figure 13:
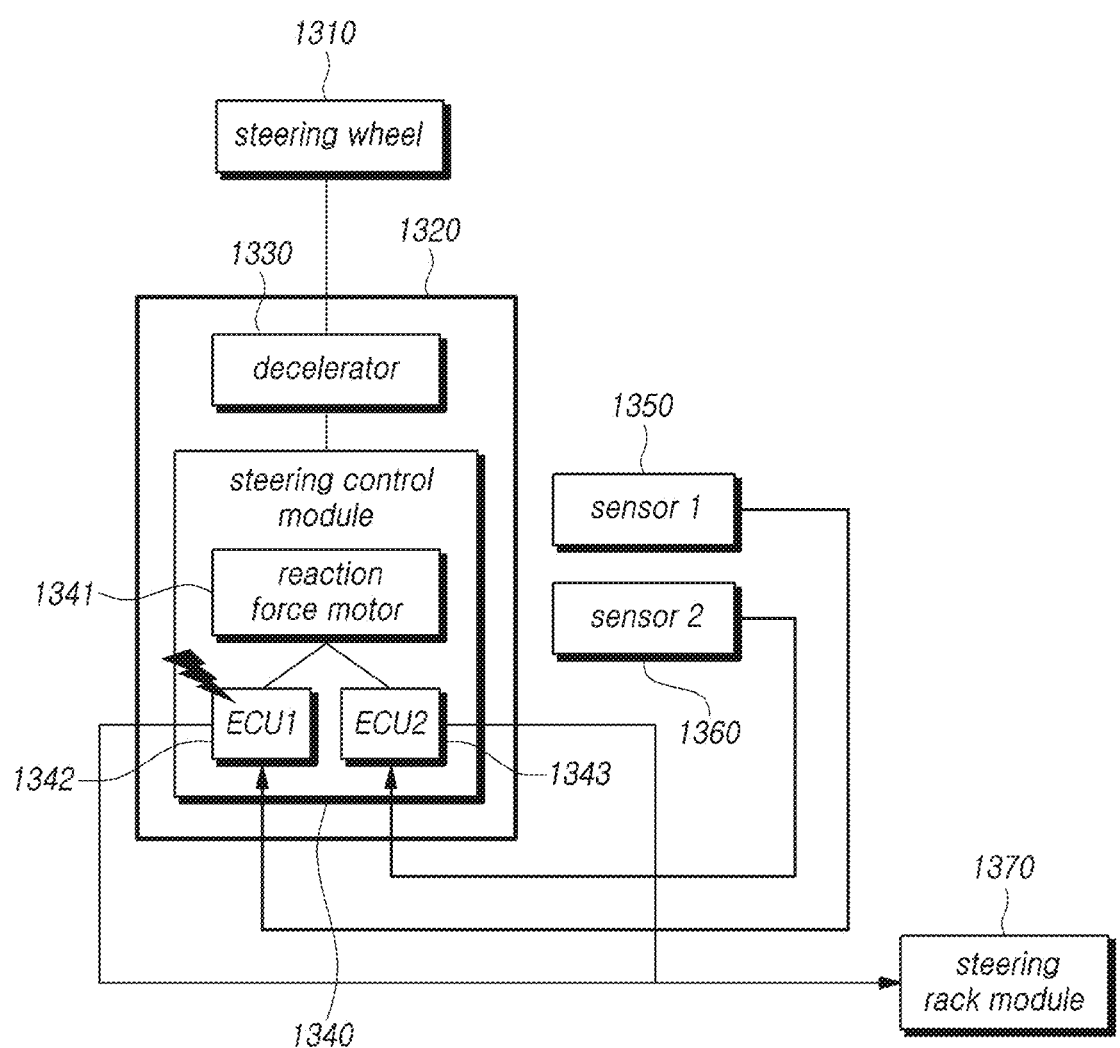
FIG. 13 is a view illustrating a steering device according to the prior art.

A steering system having the electronic control unit duplicated is described below with reference to FIG. 13. FIG. 13 is a view illustrating a steering device according to the prior art.

Referring to FIG. 13, a steering system includes a steering wheel 1310, a steering feedback actuator (SFA) 1320, sensors 1350 and 1360, and a steering rack module 1370. The SFA 1320 includes a decelerator 1330 and a steering control module 1340, and the steering control module 1340 includes a reaction force motor 1341, an ECU 1 1342, and an ECU 2 1343.

When the driver performs steering, the sensor 1350 detects vehicle information, such as the steering angle and torque of the steering wheel 1310 and the speed of the vehicle, and transmits the detected vehicle information to the ECU 1 1342. The ECU 1 1342 controls the reaction force motor 1341 using vehicle information detected during normal operation to provide a steering reaction force, and controls the steering by controlling a steering motor included in the steering rack module 1370. If a failure occurs in the ECU 1 1342, the ECU 2 1343 maintains the SFA function instead of the ECU1 1342. Specifically, the ECU 2 1343 processes the detected steering angle and provides a steering reaction force so that the driver may know the abnormal state.

However, having two ECUs as illustrated in FIG. 13 increases costs and requires connection and communication between the two ECUs and other components, causing the configuration more complicated. In the present disclosure, there are provided a steering device that, although having only one ECU, renders it possible to provide a steering reaction force when the ECU fails and a method for controlling the same.

Figure 1:
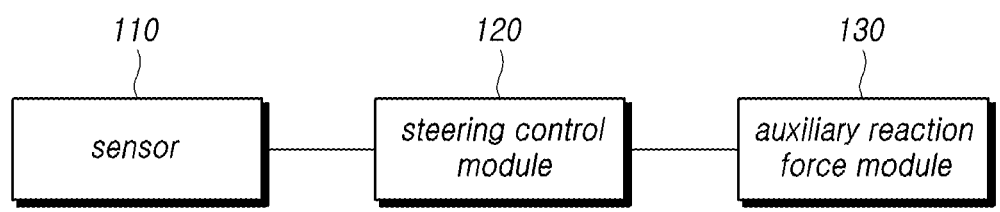
FIG. 1 is a view schematically illustrating a configuration of a steering device according to an embodiment of the disclosure.

FIG. 1 is a view illustrating a configuration of a steering device according to an embodiment of the disclosure.

According to the disclosure, a steering device includes a sensor unit 110 measuring a steering angle by a steering force of a steering wheel, a steering control module 120 including one electronic control unit to control a reaction force motor using steering angle information measured by the sensor unit 110, and an auxiliary reaction force module 130 providing a reaction force to a steering shaft or a motor shaft as no current is applied by the electronic control unit when the electronic control unit abnormally operates.

According to an embodiment of the disclosure, the sensor unit 110 of the steering device measures the steering angle by the steering force of the steering wheel. The sensor unit 110 may detect the steering force for the steering wheel applied by the driver, as steering torque. Further, the sensor unit 110 may include an in-vehicle sensor capable of measuring vehicle information for the host vehicle, e.g., the speed of the host vehicle.

According to an embodiment of the disclosure, the steering control module 120 of the steering device includes a reaction force motor and one electronic control unit that controls the reaction force motor using the steering angle information measured by the sensor unit 110. The electronic control unit receives the steering angle information measured by the sensor unit 110 and transmits a control signal to the reaction force motor so as to provide a steering reaction force using the received steering angle information. Further, the electronic control unit transmits a control signal to a steering motor included in the steering rack module to perform steering control. To generate a control signal to control the steering motor included in the steering rack module, the electronic control unit may further receive vehicle information, such as steering torque and/or the speed of the host vehicle, from the sensor unit 110 or another sensor. The electronic control unit may control steering using the received steering angle information, steering torque, and/or vehicle information.

According to the disclosure, the auxiliary reaction force module 130 of the steering device is mounted on the steering shaft or the motor shaft. The auxiliary reaction force module 130 may be mounted on the steering shaft or motor shaft whichever, where it is connected to the shaft to provide a feeling of reaction force to the steering wheel. Here, the steering shaft is a shaft that is positioned ahead of the decelerator (on the side of the steering wheel) to connect the steering wheel with the steering gear, and the motor shaft is a shaft that is positioned behind the decelerator (on the opposite side of the steering wheel) and connects with the motor. As an example, if the reaction force motor of the steering control module is connected in series to the steering shaft, the steering shaft and the motor shaft are connected via one shaft. The auxiliary reaction force module 130 may be mounted anywhere on the shaft where the steering shaft and the motor shaft are mounted as long as a feeling of reaction force may be provided to the steering wheel. As another example, if the reaction force motor of the steering control module is connected in parallel with the steering shaft, the auxiliary reaction force module 130 may be mounted on the steering shaft connected with the steering wheel to provide a feeling of reaction force to the steering wheel or may be mounted on the motor shaft connected with the motor to provide a feeling of reaction force to the steering wheel through a gear or belt mounted on the motor shaft.

According to an embodiment of the disclosure, the auxiliary reaction force module 130 of the steering device provides a reaction force to the steering shaft or the motor shaft as no current is applied by the electronic control unit when the electronic control unit abnormally operates. The auxiliary reaction force module 130 is configured to provide no reaction force to the steering shaft or the motor shaft when the electronic control unit normally operates and to provide a reaction force to the steering shaft or the motor shaft when the electronic control unit abnormally operates.

Specifically, the auxiliary reaction force module 130 of the steering device includes an electromagnet to provide a reaction force. When the electronic control unit normally operates, the electronic control unit supplies current to the auxiliary reaction force module 130. The current supplied by the electronic control unit is provided to the electromagnet of the auxiliary reaction force module 130 to magnetize it, so that the electromagnet moves the auxiliary reaction force module 130 in the direction along which the auxiliary reaction force module 130 does not provide steering reaction force to the steering shaft or the motor shaft.

In contrast, when the electronic control unit operates abnormally, no current is supplied to the auxiliary reaction force module 130. Here, the abnormal operation of the electronic control unit includes failure to normally transmit or receive a control signal by the ECU, such as by a failure or error in the electronic control unit itself, a failure in the power source or battery, or a failure in the communication path or communication scheme of the vehicle, and impossibility for the electronic control unit to normally control due to, e.g., a failure in the reaction force motor. When no current is supplied to the auxiliary reaction force module 130, the electromagnet of the auxiliary reaction force module 130 is not magnetized, so that the auxiliary reaction force module 130 is positioned to be able to provide a steering reaction force to the steering shaft or the motor shaft.

According to the disclosure, the steering device needs only a relatively simple configuration, such as one electronic control unit and an electromagnet and a mechanism capable of providing steering reaction force. Accordingly, it is possible to save costs as compared to the prior art which has two electronic control units. Further, a steering reaction force may be provided by the auxiliary reaction force module even when the electronic control unit fails. Thus, driving stability may be enhanced.

Figure 2:
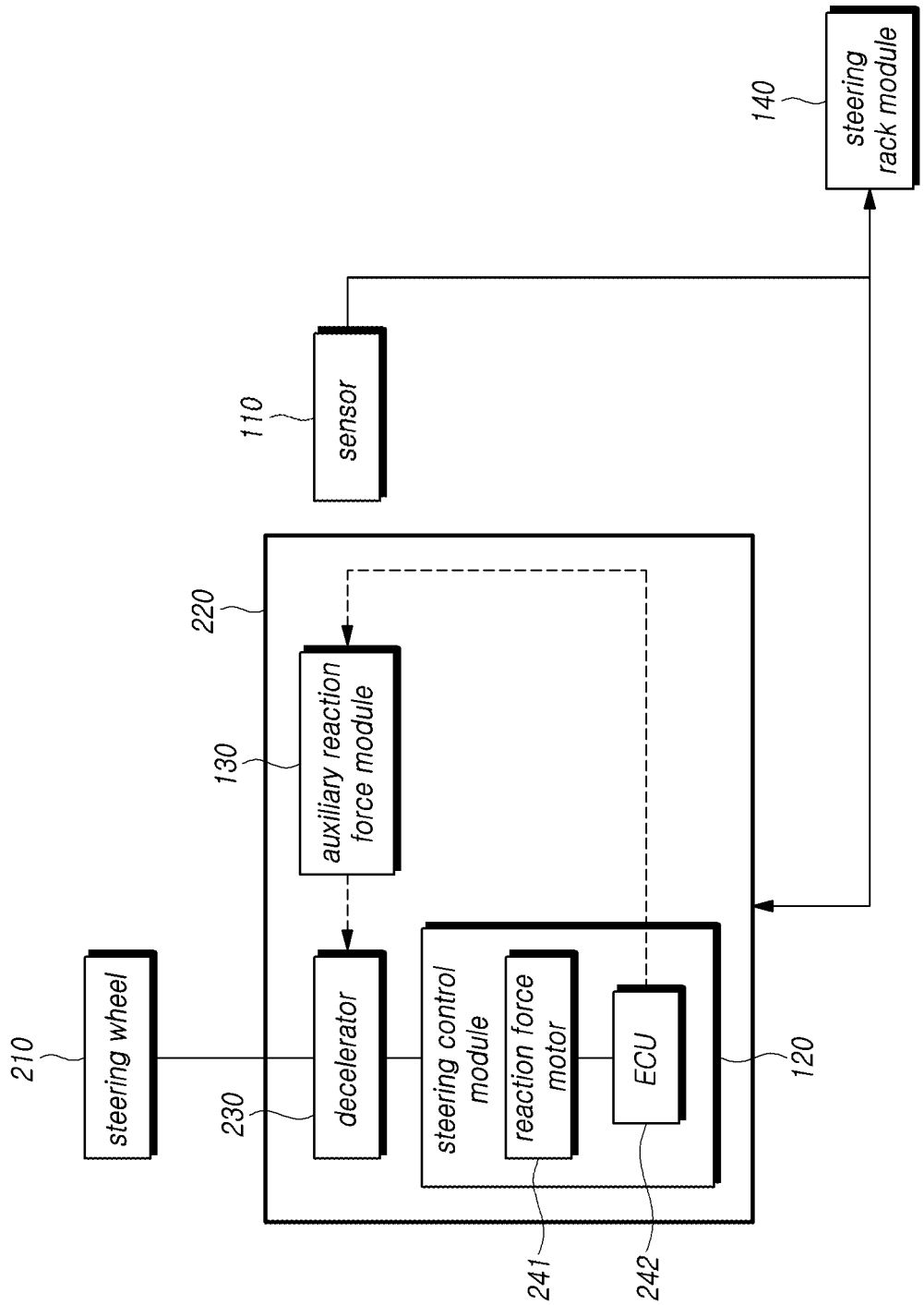
FIG. 2 is a view illustrating a configuration of a steering device according to an embodiment of the disclosure.
Figure 3:
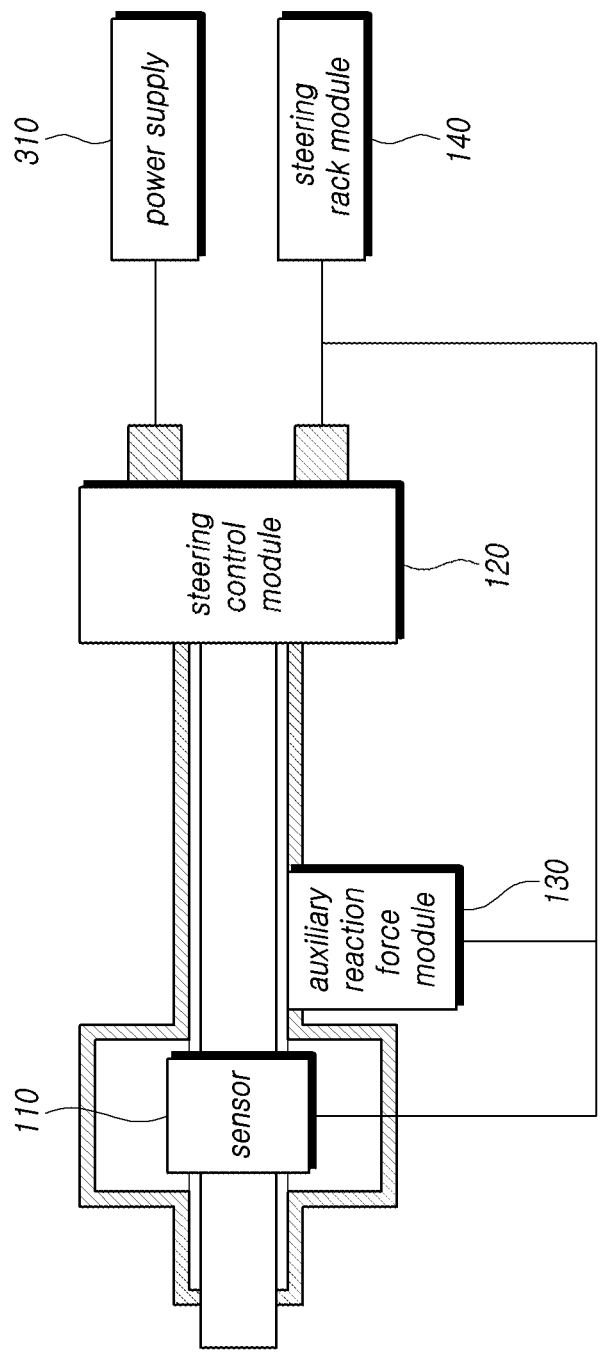
FIG. 3 is a view illustrating a structure of a steering device according to an embodiment of the disclosure.

FIGS. 2 and 3 are views illustrating a configuration of a steering device according to an embodiment of the disclosure. FIGS. 2 and 3 illustrate a configuration in which a steering device according to the disclosure is applied to a steer-by-wire (SBW).

The SBW includes an input-side mechanism and an output-side mechanism. The input-side mechanism may be denoted as a steering column module, and includes a steering wheel 210, a steering feedback actuator (SFA) 220, and a sensor unit 110. The SFA 220 includes a decelerator 230, an auxiliary reaction force module 130, and a steering control module 120, and the steering control module 120 includes a reaction force motor 241 and an ECU 242 that controls the reaction force motor. The output-side mechanism may be denoted as the steering rack module 140, and includes a road wheel actuator (RWA). The steering rack module is configured to perform steering control on the wheels of the vehicle.

The sensor unit 110 detects the steering angle, transmits the steering angle information to the SFA 220, and transmits the steering angle information and target rack displacement information to the steering rack module 140. Further, the sensor unit 110 may further detect internal information for the vehicle, such as steering torque, and transmit various types of detected information to the SFA 220 and/or the steering rack module 140. The SFA 220 provides a steering reaction force based on the received information. The steering rack module 140 controls steering with a corresponding rack displacement based on the received information.

Here, the information transmitted to the SFA 220 and the steering rack module 140 by the sensor unit may be transmitted using a vehicle CAN communication scheme. Alternatively, the information measured by the sensor unit may use a FlexRay or Ethernet communication scheme. Accordingly, even when the electronic control unit operates abnormally, information for the vehicle, such as steering angle information, steering torque information, and rack displacement information measured by the sensor unit, may be transmitted to the steering rack module 140 using a communication scheme. In other words, the steering rack module 140 may receive various pieces of information measured by the sensor unit, such as steering angle information, steering torque information, and rack displacement information, regardless of the operating state of the electronic control unit of the steering control module, so that steering control may be performed regardless of the operating state of the electronic control unit. Therefore, the steering rack module 140 may control steering based on the received information even when the electronic control unit of the SFA 220 operates abnormally, so that the steering device of the present disclosure may enhance driving stability.

Figure 4:
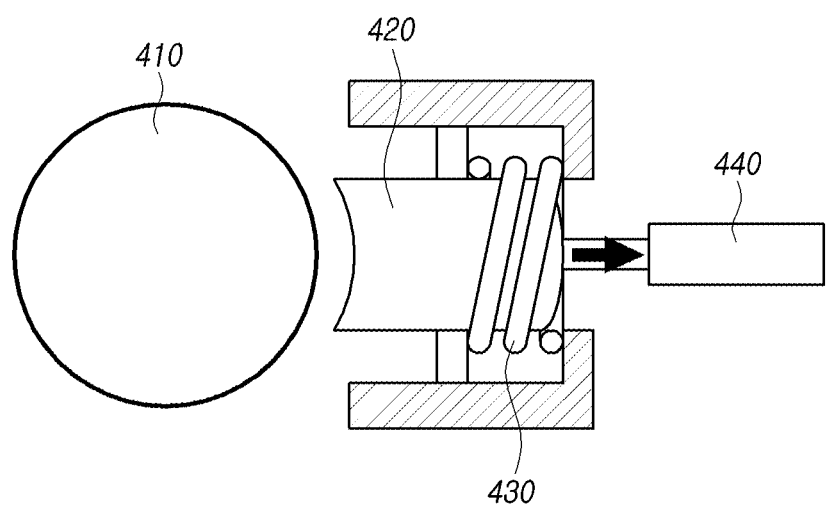
FIG. 4 is a view illustrating a state of an auxiliary reaction force module including a yoke when an electronic control unit is in a normal state according to an embodiment of the disclosure.
Figure 5:
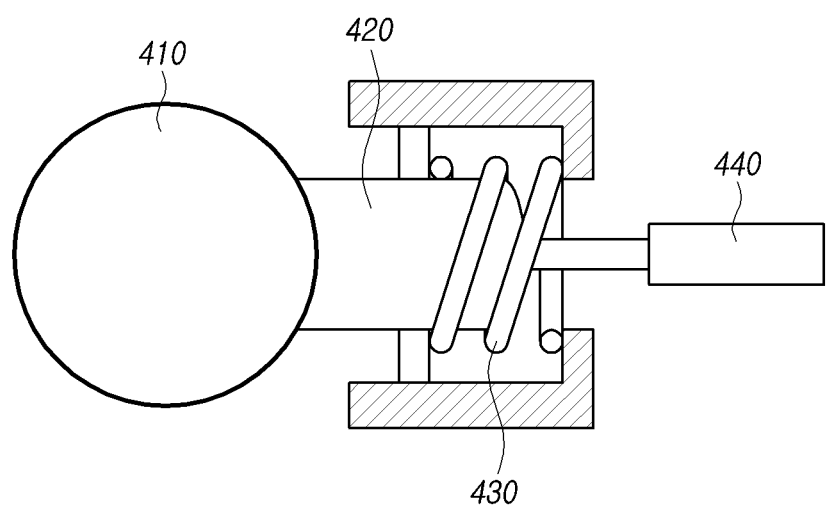
FIG. 5 is a view illustrating a state of an auxiliary reaction force module including a yoke when an electronic control unit is in an abnormal state according to an embodiment of the disclosure.

FIG. 4 is a view illustrating a state of an auxiliary reaction force module of a steering device in a normal state of an electronic control unit when the auxiliary reaction force module of the steering device includes an electromagnet, a yoke, and a spring according to an embodiment of the disclosure. FIG. 5 is a view illustrating a state of an auxiliary reaction force module of a steering device in an abnormal state of an electronic control unit when the auxiliary reaction force module of the steering device includes an electromagnet, a yoke, and a spring according to an embodiment of the disclosure.

Referring to FIGS. 4 and 5, according to an embodiment of the disclosure, an auxiliary reaction force module of a steering device includes an electromagnet 440, a yoke 420 and a spring 430. The yoke 420 indicates a component formed in a U shape to contact the steering shaft or the motor shaft 410.

In one embodiment, when the electronic control unit of the steering control module operates normally, the electronic control unit applies a current to the electromagnet 440 of the auxiliary reaction force module. The electromagnet 440 to which current is applied from the electronic control unit creates a magnetic field and is forced to the right in FIG. 4. In other words, the electromagnet 440 exerts a force in the direction away from the steering shaft or the motor shaft 410. Accordingly, the yoke 420 connected to the electromagnet 440 is pulled in a direction away from the steering shaft or the motor shaft 410, and the spring 430 is compressed. Accordingly, the yoke 420 remains spaced apart from the steering shaft or the motor shaft 410 by a predetermined distance, and no steering reaction force is provided to the steering shaft or the motor shaft 410.

In one embodiment, when the electronic control unit operates abnormally, the electronic control unit applies no current to the electromagnet 440 of the auxiliary reaction force module. Since the electromagnet 440 receives no current from the electronic control unit, no magnetic field is created around the electromagnet 440, so that the force that moves the electromagnet 440 away from the steering shaft or the motor shaft 410 does not act. In this case, the spring 430 exerts an elastic force to return to its original state, moving the yoke 420 towards the steering shaft or the motor shaft 410. Accordingly, the yoke 420 comes in tight contact with the steering shaft or the motor shaft 410, providing a reaction force to the steering shaft or the motor shaft 410.

Figure 6:
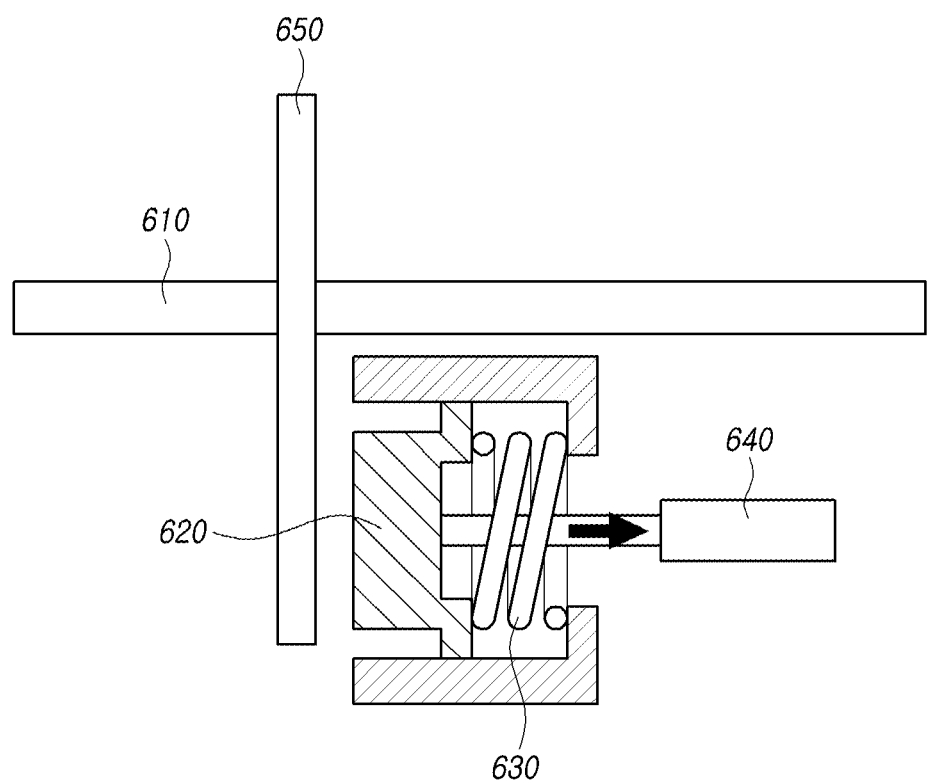
FIG. 6 is a view illustrating a state of an auxiliary reaction force module including a friction pad when an electronic control unit is in a normal state according to an embodiment of the disclosure.
Figure 7:
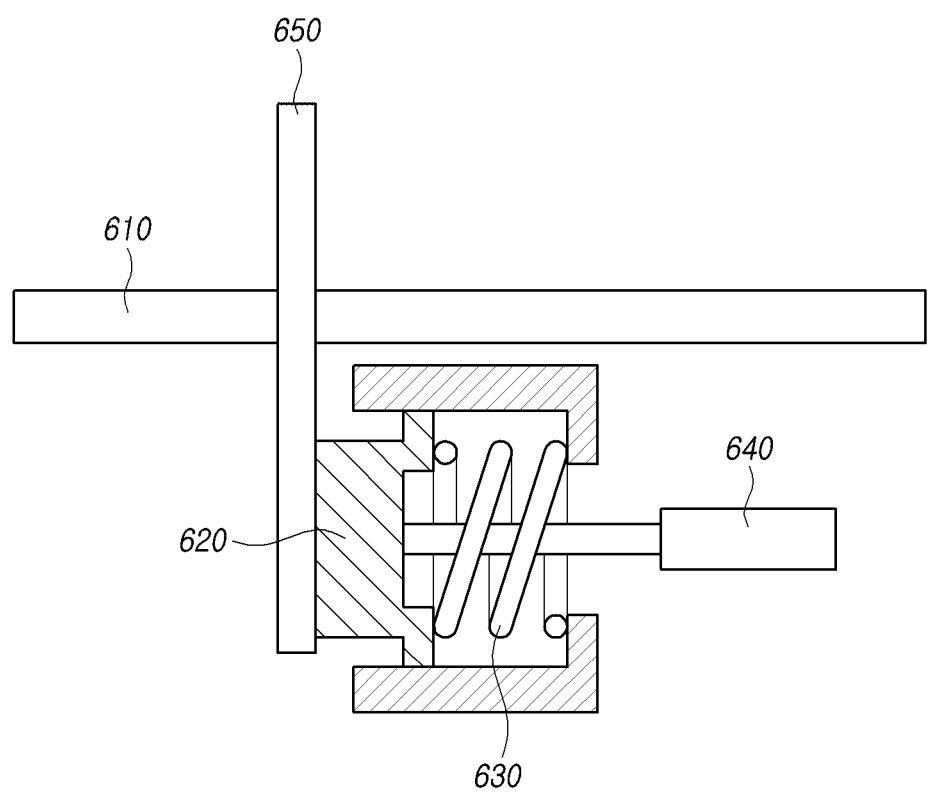
FIG. 7 is a view illustrating a state of an auxiliary reaction force module including a friction pad when an electronic control unit is in an abnormal state according to an embodiment of the disclosure.

FIG. 6 is a view illustrating a state of an auxiliary reaction force module of a steering device in a normal state of an electronic control unit when the auxiliary reaction force module of the steering device includes an electromagnet, a friction pad, and a spring according to an embodiment of the disclosure. FIG. 7 is a view illustrating a state of an auxiliary reaction force module of a steering device in an abnormal state of an electronic control unit when the auxiliary reaction force module of the steering device includes an electromagnet, a friction pad, and a spring according to an embodiment of the disclosure.

Referring to FIGS. 6 and 7, according to an embodiment of the disclosure, the steering device includes a flat plate 650 mounted in a direction perpendicular to the steering shaft or the motor shaft 610, and the auxiliary reaction force module includes an electromagnet 640, a friction pad 620, and a spring 630.

In one embodiment, when the electronic control unit of the steering control module operates normally, the electronic control unit applies a current to the electromagnet 640 of the auxiliary reaction force module. The electromagnet 640 to which current is applied from the electronic control unit creates a magnetic field and is forced to the right in FIG. 6. In other words, the electromagnet 640 exerts a force in the direction away from the flat plate 650. Accordingly, the friction pad 620 connected to the electromagnet 440 is pulled in a direction away from the flat plate 650, and the spring 630 is compressed. Accordingly, the friction pad 620 remains spaced apart from the flat plate 650 by a predetermined distance, and no steering reaction force is provided to the steering shaft or the motor shaft 610.

In one embodiment, when the electronic control unit operates abnormally, the electronic control unit applies no current to the electromagnet 640 of the auxiliary reaction force module. Since the electromagnet 640 receives no current from the electronic control unit, no magnetic field is created around the electromagnet 640, so that the force that moves the electromagnet 640 away from the flat plate 650 does not act. In this case, the spring 630 exerts an elastic force to return to its original state, moving the friction pad 620 towards the flat plate 650. Accordingly, the friction pad 620 comes in tight contact with the flat plate 650 to provide friction to the flat plate 650, thereby providing a reaction force to the steering shaft or the motor shaft 610.

Figure 8:
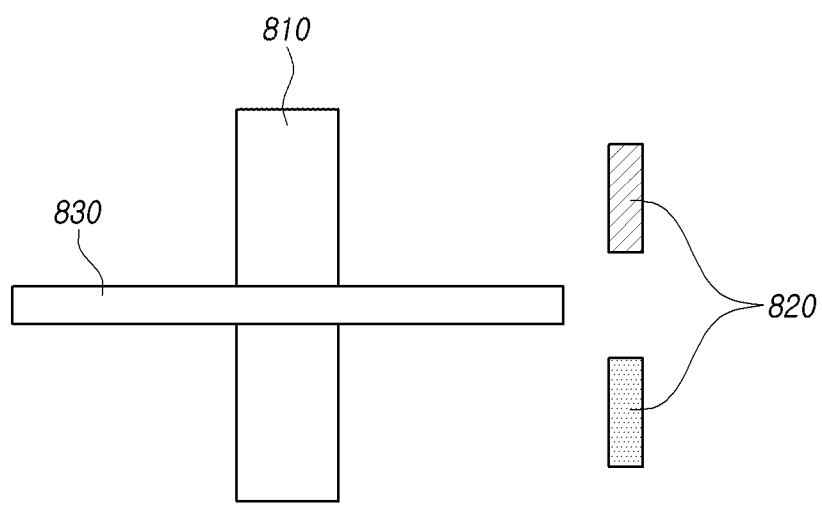
FIG. 8 is a view illustrating a state of an auxiliary reaction force module including a permanent magnet when an electronic control unit is in a normal state according to an embodiment of the disclosure.
Figure 9:
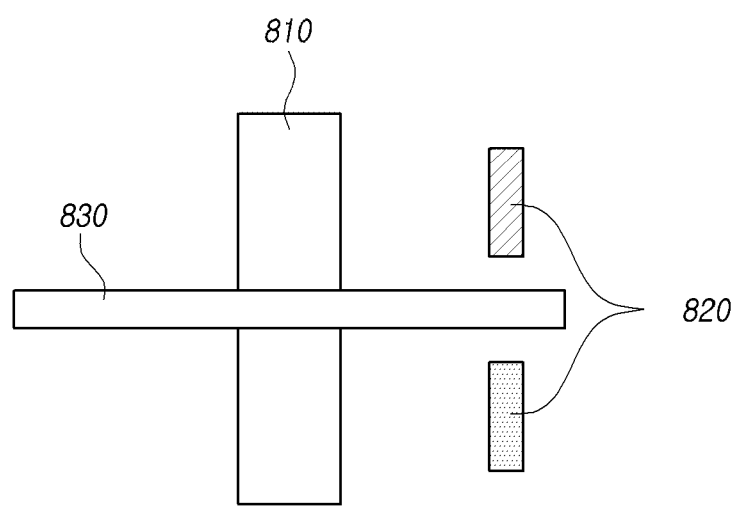
FIG. 9 is a view illustrating a state of an auxiliary reaction force module including a permanent magnet when an electronic control unit is in an abnormal state according to an embodiment of the disclosure.
Figure 10:
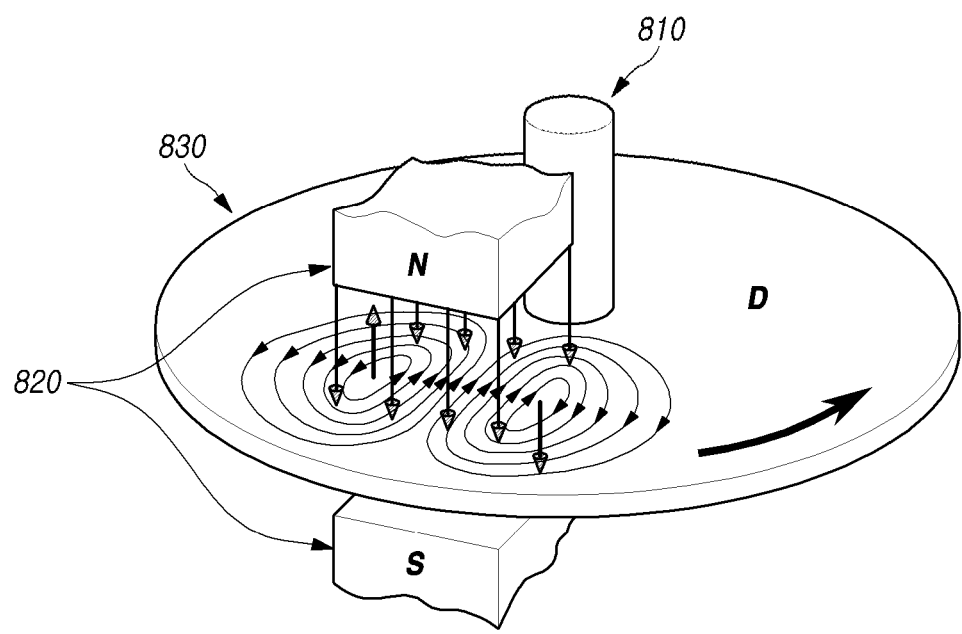
FIG. 10 is a view illustrating an operating principle of an auxiliary reaction force module of a steering device according to an embodiment of the disclosure.

FIG. 8 is a view illustrating a state of an auxiliary reaction force module of a steering device in a normal state of an electronic control unit when the auxiliary reaction force module of the steering device includes an electromagnet and a permanent magnet according to an embodiment of the disclosure. FIG. 9 is a view illustrating a state of an auxiliary reaction force module of a steering device in an abnormal state of an electronic control unit when the auxiliary reaction force module of the steering device includes an electromagnet and a permanent magnet according to an embodiment of the disclosure. FIG. 10 is a view illustrating an operating principle of an auxiliary reaction force module of a steering device when the auxiliary reaction force module of the steering device includes an electromagnet and a permanent magnet according to an embodiment of the disclosure.

Referring to FIGS. 8, 9, and 10, according to an embodiment of the disclosure, the steering device includes a metal plate 830 mounted in a direction perpendicular to the steering shaft or the motor shaft 810, and the auxiliary reaction force module includes an electromagnet (not shown) and a permanent magnet 820. The permanent magnet 820 includes magnets having different polarities, and as may be seen in FIGS. 8 to 10, the magnets having different polarities face each other with respect to the metal plate 830.

In one embodiment, when the electronic control unit of the steering control module operates normally, the electronic control unit applies a current to the electromagnet of the auxiliary reaction force module. The electromagnet to which current is applied from the electronic control unit creates a magnetic field and is forced to the right in FIG. 8. In other words, the electromagnet exerts a force in the direction away from the steering shaft or the motor shaft 810. Accordingly, the permanent magnet 820 directly or indirectly connected to the electromagnet is pulled in a direction away from the steering shaft or the motor shaft 810 and the metal plate 830. Accordingly, the permanent magnet 820 remains spaced apart from the steering shaft or the motor shaft 810 and the metal plate 830 by a predetermined distance, and no steering reaction force is provided to the steering shaft or the motor shaft 810.

In one embodiment, when the electronic control unit operates abnormally, the electronic control unit applies no current to the electromagnet of the auxiliary reaction force module. Since the electromagnet receives no current from the electronic control unit, no magnetic field is created around the electromagnet 440, so that the force that moves the permanent magnet away from the steering shaft or the motor shaft 810 and the metal plate 830 does not act. In this case, the permanent magnet 820 is moved towards the steering shaft or the motor shaft 810 and is positioned above and below the metal plate 830. Referring to FIG. 10, the N-pole magnet is positioned above the metal plate 830 and the S-pole magnet is positioned below the metal plate 830. An induced electromotive force is generated due to the magnetic difference and generates an eddy current in the metal plate 830, perpendicular to the magnetic flux. Accordingly, the permanent magnet 820 generates an eddy current in the metal plate 830, thereby applying a rotational force to the metal plate 830 and hence providing a reaction force to the steering shaft or the motor shaft 810.

The magnitude range of the reaction force provided by the auxiliary reaction force module of the steering device of the present disclosure is determined by the load of the auxiliary reaction force module. Therefore, the maximum magnitude of reaction force that may be provided to the steering wheel by the auxiliary reaction force module is predetermined. In other words, the maximum magnitude of the steering reaction force does not exceed the load of the auxiliary reaction force module even when the auxiliary reaction force module does not normally operate so that a reaction force is provided to the steering wheel. The auxiliary reaction force module may differ in size depending on the position where the auxiliary reaction force module is mounted, and the auxiliary reaction force module may be sized and shaped (e.g., the auxiliary reaction force module described above in connection with FIGS. 4 to 8) to be able to provide an appropriate reaction force to the steering wheel depending on the mounting position of the auxiliary reaction force module.

According to one embodiment, the maximum magnitude of reaction force provided to the steering wheel by the auxiliary reaction force module of the present disclosure is 4 Nm. In other words, the maximum magnitude of reaction force provided by the auxiliary reaction force module is 4 Nm with respect to the steering wheel. As an example, when the auxiliary reaction force module is mounted on the steering shaft, the auxiliary reaction force module may provide a reaction force up to 4 Nm to the steering shaft, and accordingly, a reaction force up to 4 Nm is provided to the steering wheel. As another example, when the auxiliary reaction force module is mounted on the motor shaft, the auxiliary reaction force module is configured to provide a reaction force up to 4 Nm to the steering wheel. Accordingly, a reaction force up to 4 Nm may be provided to the steering wheel by the auxiliary reaction force module. Here, 4 Nm is the magnitude of reaction force in which a change in steering feel may be perceived by the driver but is not excessive and, at this value, it is possible to ensure driving stability while providing a notification for the status of the host vehicle. In the present disclosure, the maximum magnitude of the reaction force provided to the steering wheel by the auxiliary reaction force module may be determined to be a different value depending on the actual application situation.

Figure 11:
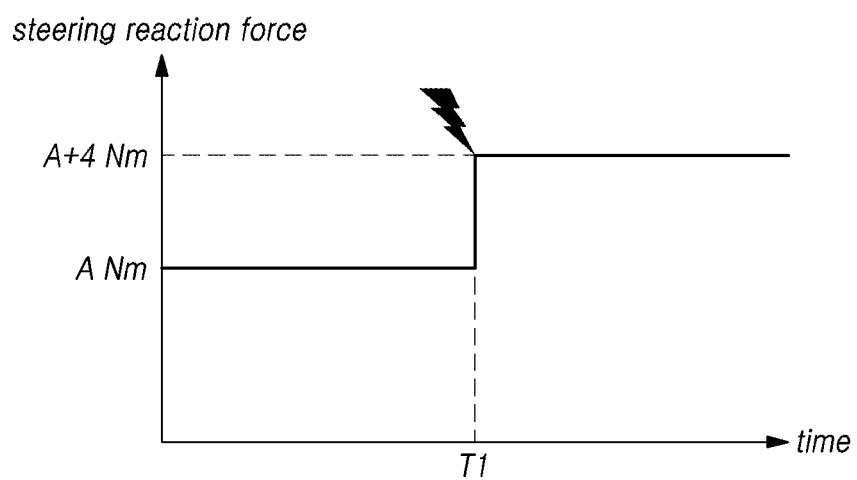
FIG. 11 is a graph illustrating a magnitude of a steering reaction force provided to a steering wheel according to an embodiment of the disclosure.

Meanwhile, when a reaction force is provided by the auxiliary reaction force module may include when the auxiliary reaction force module provides a reaction force due to a failure in the electronic control unit or when the auxiliary reaction force module provides a reaction force due to a failure in the auxiliary reaction force module (e.g., an error in controlling current to the auxiliary reaction force module). A reaction force provided to the steering wheel when a reaction force is additionally provided from the auxiliary reaction force module due to a failure in the auxiliary reaction force module in the normal state of the electronic control unit is described with reference to FIG. 11. Referring to FIG. 11, at time 0, T1 denotes a state in which the steering reaction force (A Nm) is controlled by the electronic control unit. When the auxiliary reaction force module fails at T1 (e.g., when current is not normally supplied to the auxiliary reaction force module) while the electronic control unit is operating normally, a reaction force by the auxiliary reaction force module may be additionally provided to the steering wheel. In this case, the magnitude of reaction force that may be provided to the steering wheel by the auxiliary reaction force module is 4 Nm. Therefore, after T1, when the auxiliary reaction force module fails, the sum, (A+4) Nm, of the existing steering reaction force and the reaction force by the auxiliary reaction force module is provided. Here, the reaction force, 4 Nm, provided by the auxiliary reaction force module is a value at which it is possible to ensure driving stability while providing a notification for the status of the host vehicle as described above. Accordingly, even when a fluctuation in reaction force occurs due to a failure in the auxiliary reaction force module, the reaction force is changed within a predetermined value range, thereby ensuring stability.

Figure 14:
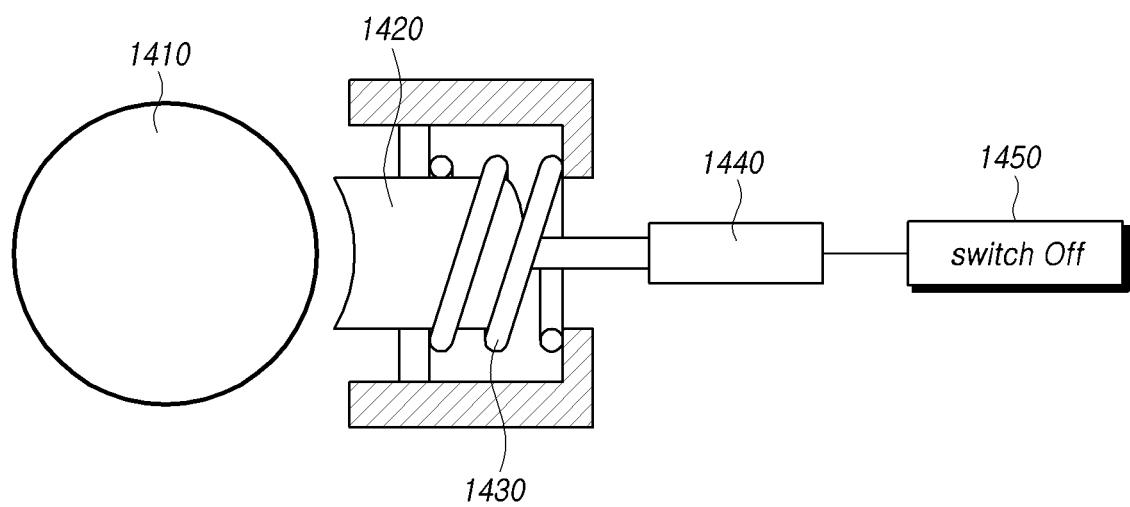
FIG. 14 is a view illustrating a state of an auxiliary reaction force module including a switch unit when an electronic control unit is in a normal state according to an embodiment of the disclosure.
Figure 15:
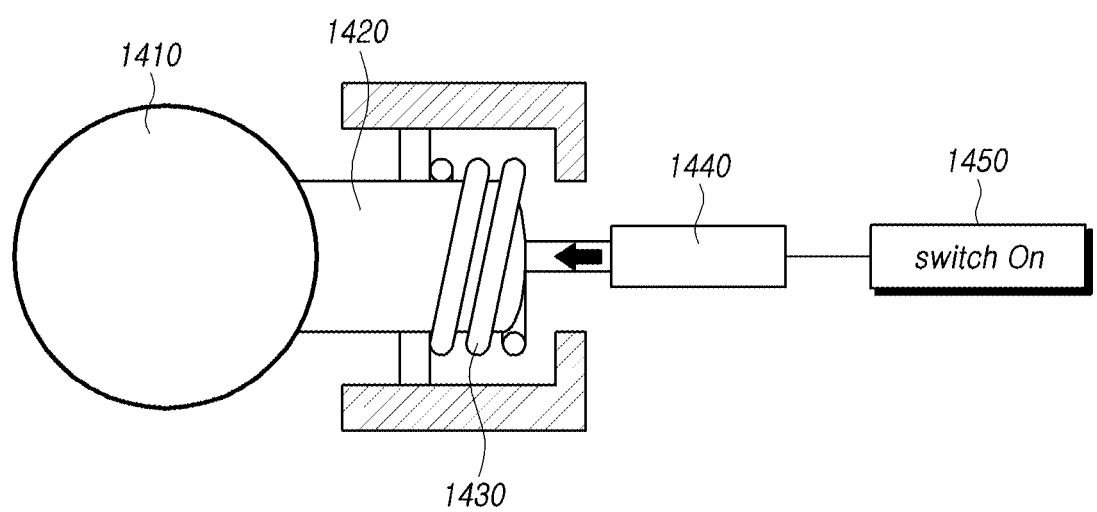
FIG. 15 is a view illustrating a state of an auxiliary reaction force module including a switch unit when an electronic control unit is in an abnormal state according to an embodiment of the disclosure.

According to an embodiment, referring to FIGS. 14 and 15, the auxiliary reaction force module of the steering device of the present disclosure may further include a switch unit 1450 that opens or shorts the current supply line in addition to the auxiliary reaction force module, based on the current by the electronic control unit. According to an example, the switch unit 1450 may be implemented as a relay. However, this is an example, and the switch unit 1450 is not limited by a specific type or name if it may be turned on/off according to an abnormal operation of the electronic control unit.

According to an example, the switch unit 1450 may short the current supply line to allow the auxiliary reaction force module to provide a reaction force to the steering shaft or the motor shaft when the electronic control unit abnormally operates. Referring to FIG. 14, according to the disclosure, a reaction force module of a steering device includes an electromagnet 1440, a yoke 1420, and a spring 1430. Unlike in the above-described examples, the electromagnet 1440 is installed to exert a force in a direction approaching the steering shaft or the motor shaft 1410.

When the electronic control unit of the steering control module operates normally, the switch unit 1450 may be in an Off state. The switch unit 1450 may maintain the Off state by an open control signal received from the electronic control unit. Unlike described above in connection with FIG. 4, the spring 1430 remains uncompressed in normal times. Since the switch unit 1450 is in the Off state, no current is applied to the auxiliary reaction force module. Since no current is applied to the electromagnet 1440, no magnetic field is created, so that the force pushing the electromagnet 1440 toward the steering shaft or the motor shaft 1410 does not act.

When the electronic control unit becomes an abnormal state, no open control signal is received from the electronic control unit, so that the switch unit 1450 may turn to the On state. Accordingly, current is applied to the electromagnet 1440 of the auxiliary reaction force module. A magnetic field is created around the electromagnet 1440 to which the current is applied, and as illustrated in FIG. 15, the electromagnet 1440 is forced to the left. In other words, the electromagnet 1440 exerts a force in the direction approaching the steering shaft or the motor shaft 1410. Accordingly, the yoke 1420 connected to the electromagnet 1440 is pushed in the direction approaching the steering shaft or the motor shaft 1410, and the spring 1430 is compressed. Accordingly, the yoke 1420 comes in tight contact with the steering shaft or the motor shaft 1410, providing a reaction force to the steering shaft or the motor shaft 1410.

Thus, since it may be sufficient to maintain an open control signal for the switch unit in normal times rather than applying current to the electromagnet of the auxiliary reaction force module, it is possible to reduce the power consumption required to pull the electromagnet.

Although it has been described above in connection with FIGS. 14 and 15 that the auxiliary reaction force module includes a yoke, embodiments of the disclosure are not limited thereto. Substantially the same description given above may apply even where the auxiliary reaction force module includes a friction pad as illustrated in FIGS. 6 and 7 or where the auxiliary reaction force module includes a permanent magnet as illustrated in FIGS. 8 to 10. In other words, the description related to turning on the switch to apply current to the electromagnet included in the auxiliary reaction force module when the electronic control unit abnormally operates may apply likewise.

Figure 12:
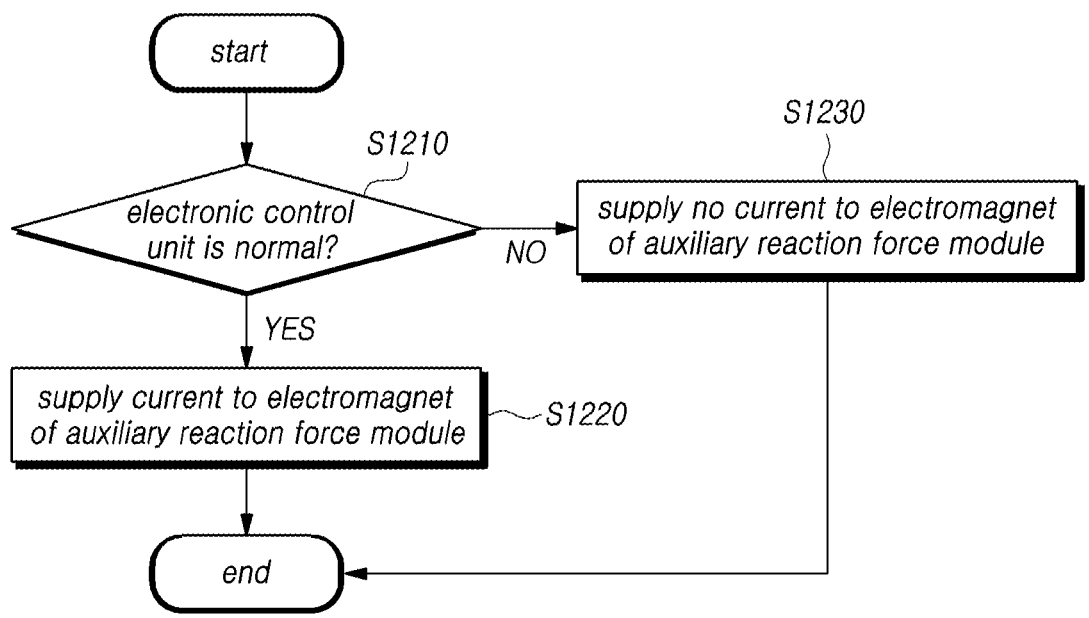
FIG. 12 is a flowchart illustrating a steering control method according to an embodiment of the disclosure.

FIG. 12 is a flowchart illustrating a steering control method according to an embodiment of the disclosure.

According to the disclosure, a steering control method includes receiving steering angle information by a steering force of a steering wheel measured by a sensor unit, by an electronic control unit of a steering control module, controlling a reaction force motor using the steering angle information measured by the sensor unit, by the electronic control unit, and supplying no current to the auxiliary reaction force module, by the electronic control unit, to allow the electronic control unit to provide a reaction force to a steering angle or a motor shaft when the electronic control unit abnormally operates.

In one embodiment, the electronic control unit of the steering control module of the present disclosure determines the state of the corresponding electronic control unit (S1210). The state of the electronic control unit may be determined periodically or in real time. When the electronic control unit operates normally, the electronic control unit supplies current to the auxiliary reaction force module (S1220). Accordingly, the auxiliary reaction force module does not provide reaction force to the steering shaft or the motor shaft. In contrast, when the electronic control unit operates abnormally, the electronic control unit does not supply current to the auxiliary reaction force module (S1230). Accordingly, the auxiliary reaction force module provides reaction force to the steering shaft or the motor shaft. The magnitude of reaction force that may be provided to the steering shaft or the motor shaft by the auxiliary reaction force module is set to a value of 4 Nm or less.

Specifically, the auxiliary reaction force module of the steering device includes an electromagnet to provide the steering reaction force. When the electronic control unit operates normally, the electronic control unit supplies current to the auxiliary reaction force module. The current supplied by the electronic control unit is provided to the electromagnet of the auxiliary reaction force module to magnetize it, so that the electromagnet moves the auxiliary reaction force module in the direction along which the auxiliary reaction force module does not provide steering reaction force to the steering shaft or the motor shaft. In contrast, when the electronic control unit operates abnormally, no current is supplied to the auxiliary reaction force module. When no current is supplied, the electromagnet of the auxiliary reaction force module is not magnetized, so that the auxiliary reaction force module is positioned to be able to provide a steering reaction force to the steering shaft or the motor shaft.

According to the disclosure, the steering device needs only a relatively simple configuration, such as one electronic control unit and an electromagnet and a mechanism capable of providing steering reaction force. Accordingly, it is possible to save costs as compared to the prior art which has two electronic control units. Further, a steering reaction force may be provided by the auxiliary reaction force module even when the electronic control unit fails. Thus, driving stability may be enhanced.

Terms, such as "system," "processor," "controller," "component," "module," "interface," "model," and "unit," described above may generally refer to computer-related entity hardware, a combination of hardware and software, software, or software being executed. For example, the above-described components may be, but are not limited to, processes driven by a processor, processors, controllers, control processors, entities, execution threads, programs, and/or computers. For example, both an application being executed by a controller or a processor and the controller or the processor may be the components. One or more components may be in a process and/or an execution thread, and the components may be located in one system or may be distributed to two or more systems.

When an element "comprises," "includes," or "has" another element, the element may further include, but rather than excluding, the other element, and the terms "comprise," "include," and "have" should be appreciated as not excluding the possibility of presence or adding one or more features, numbers, steps, operations, elements, parts, or combinations thereof. All the scientific and technical terms as used herein may be the same in meaning as those commonly appreciated by a skilled artisan in the art unless defined otherwise. It will be further understood that terms, such as those defined dictionaries, should be interpreted as having a meaning that is consistent with their meaning in the context of the relevant art and will not be interpreted in an idealized or overly formal sense unless expressly so defined herein.

The above description has been presented to enable any person skilled in the art to make and use the technical idea of the present disclosure, and has been provided in the context of a particular application and its requirements. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

The invention claimed is:

1. A steering device, comprising:
   a sensor measuring a steering angle by a steering force of a steering wheel;
   a steering control module including an electronic control unit to control a reaction force motor using steering angle information measured by the sensor;
   an auxiliary reaction force module providing a reaction force to a steering shaft or a motor shaft as no current is applied by the electronic control unit when the electronic control unit abnormally operates; and
   a metal plate mounted in a first direction perpendicular to the steering shaft or the motor shaft, wherein
   the auxiliary reaction force module includes an electromagnet, a first permanent magnet, and a second permanent magnet,
   the first permanent magnet is located on an upper side of the metal plate and is orientated to have one pole facing towards the metal plate in a second direction perpendicular to the metal plate and to be spaced away from the metal plate in the second direction,
   the second permanent magnet is located on a lower side of the metal plate and is orientated to have one pole facing towards the metal plate in the second direction perpendicular to the metal plate and to be spaced away from the metal plate in the second direction,
   the one pole of the first permanent magnet and the one pole of the second permanent magnet have different polarities,
   in a state that the electronic control unit normally operates, the electronic control unit is configured to apply a current to the electromagnet of the auxiliary reaction force module such that the electromagnet exerts a force away from the steering shaft or the motor shaft to cause the first and second permanent magnets to be spaced apart from (i) the steering shaft or the motor shaft and (ii) the metal plate by a predetermined distance in the first direction perpendicular to the steering shaft or the motor shaft, and in response to determining that the electronic control unit abnormally operates, the electronic control unit is configured to apply no current to the electromagnet of the auxiliary reaction force module such that the first and second permanent magnets move towards the steering shaft or the motor shaft to be positioned on the metal plate to generate an eddy current in the metal plate thereby applying the reaction force to the steering shaft or the motor shaft.

2. The steering device of claim 1, further comprising actuator configured to perform steering control on a wheel of a vehicle, wherein the actuator is configured to perform the steering control by receiving the steering angle information measured by the sensor regardless of an operating state of the electronic control unit of the steering control module.

3. The steering device of claim 1, wherein a maximum reaction force provided to the steering shaft or the motor shaft by the auxiliary reaction force module and exerted to the steering wheel is 4 Nm.

4. The steering device of claim 1, further comprising a switch configured to open or short a current supply line for the auxiliary reaction force module based on a current by the electronic control unit, wherein the switch is configured to short the line to allow the auxiliary reaction force module to provide the reaction force to the steering shaft or the motor shaft when the electronic control unit abnormally operates.

5. A steering control method, comprising:
  receiving steering angle information by a steering force of a steering wheel measured by a sensor, by an electronic control unit of a steering control module;
  controlling a reaction force motor using the steering angle information measured by the sensor, by the electronic control unit; and
  supplying no current to an auxiliary reaction force module, by the electronic control unit, to allow the electronic control unit to provide a reaction force to a steering shaft or a motor shaft when the electronic control unit abnormally operates, wherein a metal plate is mounted in a first direction perpendicular to the steering shaft or the motor shaft, the auxiliary reaction force module includes an electromagnet, a first permanent magnet, and a second permanent magnet, the first permanent magnet is located on an upper side of the metal plate and is orientated to have one pole facing towards the metal plate in a second direction perpendicular to the metal plate and to be spaced away from the metal plate in the second direction, the second permanent magnet is located on a lower side of the metal plate and is orientated to have one pole facing towards the metal plate in the second direction perpendicular to the metal plate and to be spaced away from the metal plate in the second direction, the one pole of the first permanent magnet and the one pole of the second permanent magnet have different polarities, in response to determining that the electronic control unit normally operates, a current is supplied to the electromagnet of the auxiliary reaction force module by the electronic control unit such that the electromagnet exerts a force in a direction away from the steering shaft or the motor shaft to cause the first and second permanent magnets to be spaced apart from (i) the steering shaft or the motor shaft and (ii) the metal plate by a predetermined distance in the first direction perpendicular to the steering shaft or the motor shaft, and in response to determining that the electronic control unit abnormally operates, no current is supplied by the electronic control unit to the electromagnet of the auxiliary reaction force module such that the first and second permanent magnets move towards the steering shaft or the motor shaft to be positioned on the metal plate to generate an eddy current in the metal plate thereby applying the reaction force to the steering shaft or the motor shaft.

* * * * *